June 20, 1961 F. E. BRETZ, JR Re. 25,001

HAND BRAKE MECHANISM

Original Filed Feb. 21, 1957 2 Sheets-Sheet 1

INVENTOR.
Frank E. Bretz, Jr.
BY
Robert R. Lockwood
Atty.

June 20, 1961 F. E. BRETZ, JR Re. 25,001

HAND BRAKE MECHANISM

Original Filed Feb. 21, 1957 2 Sheets-Sheet 2

INVENTOR.
Frank E. Bretz, Jr.
BY
Robert R. Lockwood
Atty.

United States Patent Office

Re. 25,001
Reissued June 20, 1961

25,001
HAND BRAKE MECHANISM

Frank E. Bretz, Jr., Elmhurst, Ill., assignor, by mesne assignments, to Southern Electric, Inc., Hammond, Ind., a corporation of Delaware Original No. 2,905,292, dated Sept. 22, 1959, Ser. No. 641,569, Feb. 21, 1957. Application for reissue Apr. 21, 1960, Ser. No. 23,865
12 Claims. (Cl. 192—16)

Matter enclosed in heavy brackets [ ] appears in the original patent but forms no part of this reissue specification; matter printed in italics indicates the additions made by reissue.

This invention relates, generally, to hand brake mechanisms for railway cars and it has particular relation to mechanisms of the type shown in Patent No. 2,668,457, issued February 9, 1954. This invention constitutes an improvement over the invention shown in this patent.

Among the objects of this invention are: To provide for manually applying and releasing the brakes of a railway car by turning a hand wheel, respectively, in one direction or the other in a new and improved manner; to provide ample stock for the pinion by journaling it directly on a reduced diameter section of the hand wheel shaft; to provide ample stock for the screw thread by locating it on a large diameter portion of the hand wheel shaft; to provide a separate pressure nut for cooperation with the threaded portion and to place the pressure nut in driving relation to the pinion; to rotatably mount the clutch plate on a hub of the pressure nut; to clamp a clutch plate between the pressure nut and a clutch flange in such manner that the driving connection therethrough will not be impaired by any vibration to which the car on which the brake mechanism is mounted may be subjected; and to limit the relative rotation between the pressure nut or pinion and the shaft.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawings, in which.

Figure 1:
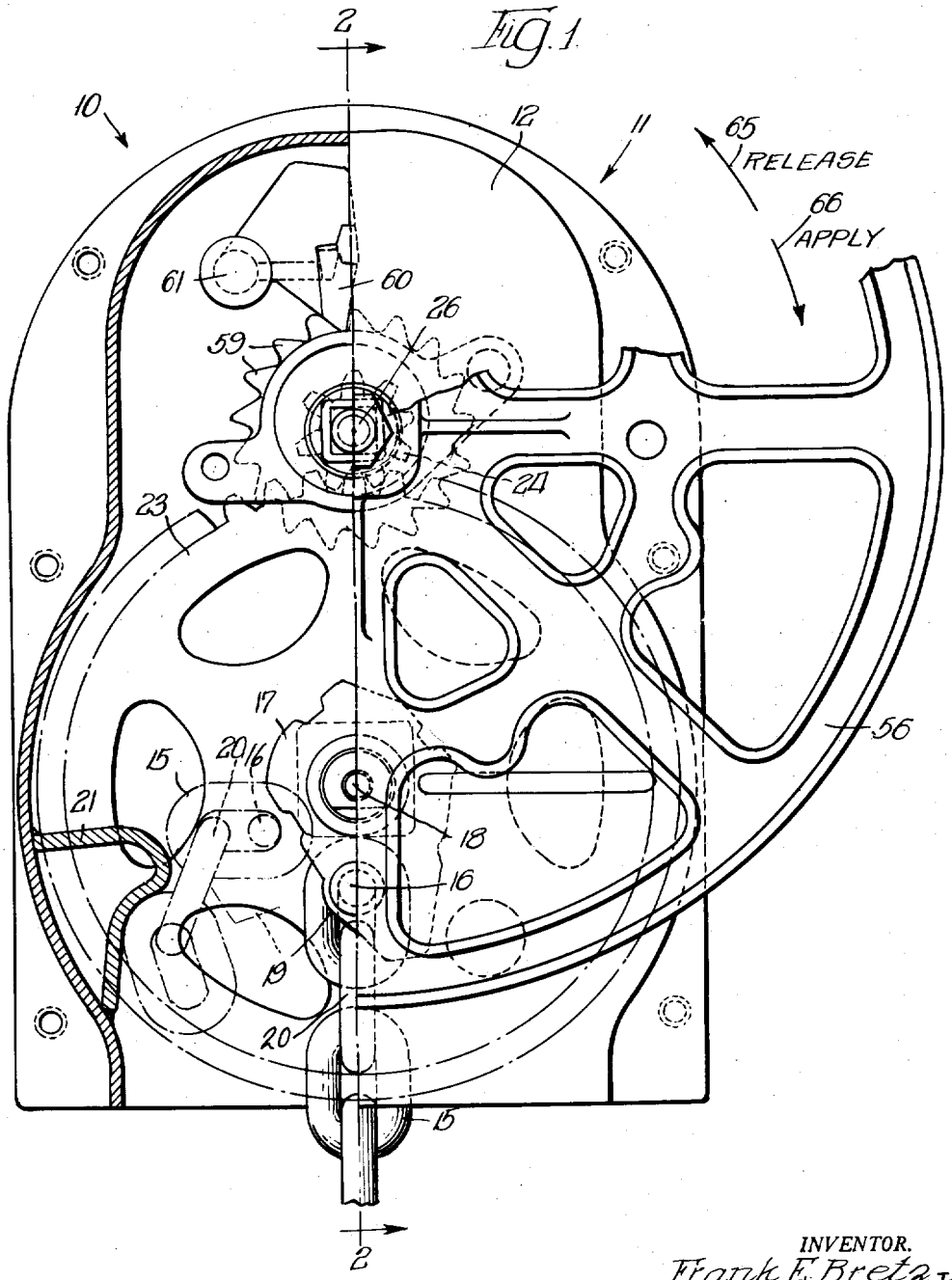
FIGURE 1 is a view, partly in front elevation and partly in section, showing a hand brake mechanism in which the present invention is embodied.

Referring now to the drawings it will be observed that the reference character 10 designates, generally, a hand brake mechanism that is intended for mounting on a railway car. The particular location on the car will depend upon the car construction as is readily understood. The mechanism 10 includes a case, shown generally at 11, that is made up of a metallic cover 12 provided with an out turned flange 13 for overlying a back plate 14 to which it is suitably secured.

The hand brake mechanism 10 is intended for manual application for the brakes of the railway car. It is used principally for holding the car in a given position on a siding or to control the speed of and stop a car at a given point during switching, etc. For this purpose a chain 15, or equivalent element, is provided and one end of it is arranged to be connected to the brake rigging in a manner well understood in the art. The other end of the chain 15 is secured by a pin 16 to a chain winding drum 17 which is rotatably mounted on a shaft 18 that is carried by the cover 12 and back plate 14, as shown.

As viewed in FIGURE 1 of the drawings the chain 15 is wound on the chain winding drum 17 by rotating it in a counterclockwise direction. It is undesirable that the drum 17 be rotated in the opposite direction to wind up the chain 15. In order to prevent improper winding of the chain 15 on the chain winding drum 17 the latter is provided with an arm 19 which is arranged to engage a second link 20 of the chain 15, as shown by the broken lines in FIGURE 1, to move it into engagement with the under side of a chain stop 21 which is secured to the inner wall of the cover 12. As will appear hereinafter, when an attempt is made to wind the chain 15 in the wrong direction on the drum 17, the brakeman is promptly aware of the improper operation and he will take the necessary steps to wind the chain 15 in the proper direction on the drum 17.

Figure 2:
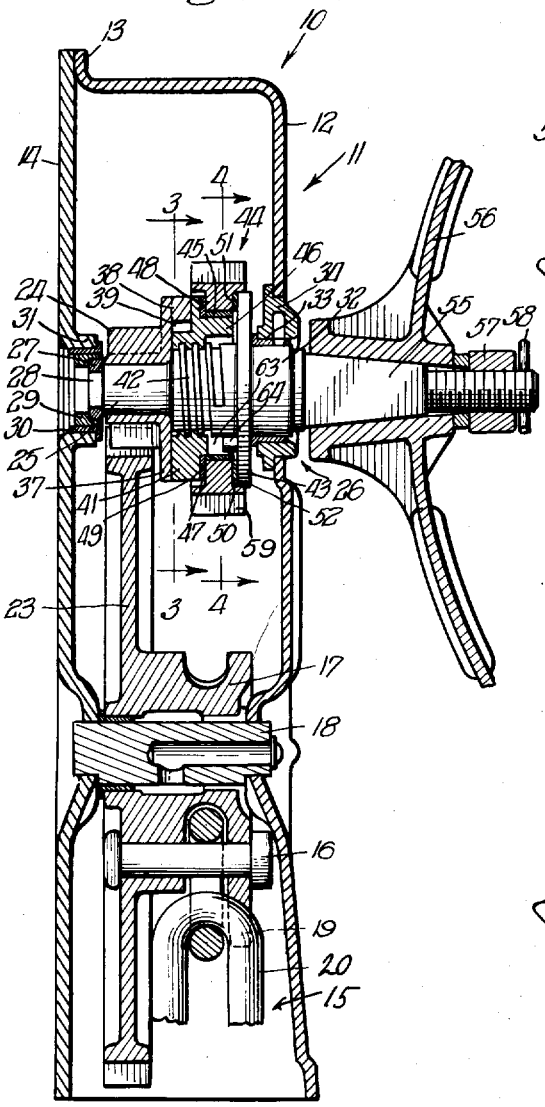
FIGURE 2 is a vertical sectional view taken generally along the line 2—2 of FIGURE 1.

The chain winding drum 17 is rotated by a main gear wheel 23. Preferably the main gear wheel 23 is formed integrally with the chain winding drum 17 as illustrated more clearly in FIGURE 2. The teeth on the periphery of the main gear wheel 23 are in driving engagement with the teeth of a pinion 24 which is freely rotatably mounted on a reduced diameter section 25 of a hand wheel shaft which is indicated, generally, at 26.

At its left hand end the hand wheel shaft 26 is provided with a split ring 27 which is positioned in an annular groove 28 and held in place therein by a retainer ring 29 which has a press fit with the extreme left hand end of the shaft 26. The retainer ring 29 is journaled in a bushing 30 which is carried by an annular flange 31 that projects from and is formed integrally with the back plate 14.

The other end of the hand wheel shaft 26 is provided with a bearing portion 32 which is journaled in a bushing 33 that is carried by a bushing housing 34 suitably stationarily mounted in the cover 12.

Figure 3:
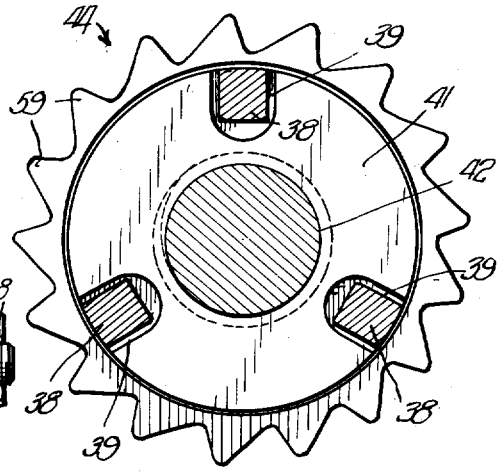
FIGURE 3 is a vertical sectional view, at an enlarged scale, taken generally along the line 3—3 of FIGURE 2.

Although the pinion 24 is freely rotatably mounted on the hand wheel shaft 26, provision is made for placing it in driving connection with the shaft in order to rotate the main gear wheel 23 and wind the chain 15 on the drum 17. For this purpose the pinion 24 has a flange 37 formed integrally therewith as a one-piece casting and lugs 38 are cast integrally therewith and extend laterally therefrom, as shown more clearly in FIGURE 3. It will be observed that three lugs 38 are provided. It will be understood that one or more lugs 38 can be employed as desired. The lugs 38 project into radial slots 39 in the juxtaposed face of a pressure nut 41. The pressure nut 41 is internally threaded onto an enlarged externally threaded section 42 of the hand wheel shaft 26. It will be understood that the pinion 24 and its flange 37 rotate conjointly with the pressure nut 41.

Formed integrally with the hand wheel shaft 26 at the right hand end of the threaded section 42 is a clutch flange 43. Disposed between the clutch flange 43 and the flange 37 is a clutch plate that is shown, generally, at 44. It is annular in shape and has an internal bushing 45 for rotatable mounting on a hub 46 that extends laterally from and is formed integrally with the pressure nut 41. It will be understood that the clutch plate 44 can rotate relative to the hub 46. It constitutes a driving connection between the clutch flange 43, integral with the hand wheel shaft 26 and the pressure nut 41 which, it will be recalled, rotates conjointly with the flange 37 and the pinion 24. The driving connection therebetween is provided by applying a compression force to opposite sides of the clutch plate 44 in a manner that now will be described.

A part of the driving connection is provided through a non-metallic friction disc 47 that may be formed of a phenolic condensation product. The disc 47 is interposed between a clutch face 48 on one side of the pressure nut 41 and a clutch face 49 on the juxtaposed side of the clutch plate 44. Another non-metallic friction disc 50, of like material, is provided on the other side of the clutch plate 44. It is positioned between a clutch face 51 on the left hand side of the clutch flange 43 and a clutch face 52 on the right hand side of the clutch plate 44. As the hand wheel shaft 26 is rotated, the pressure nut 41 is tightened on the enlarged externally threaded section 42 so as to grip the clutch plate 44 between it and the clutch flange 43. A driving connection between the shaft 26 and the pinion 24 is thereby provided.

At the right hand end of the shaft 26 is a hand wheel receiving section 55 on which a hand wheel 56 is non-rotatably mounted. It is held in position by a nut 57 and a cotter pin 58, as shown.

In order to hold the brakes in the set position it is necessary that means be provided for preventing reverse rotation of the clutch plate 44. For this purpose its periphery is provided with ratchet teeth 59 with which a pawl 60 cooperates. As shown in FIGURE 1 the pawl 60 is rockably mounted at 61 on the case 11. It is biased by gravity into engagement with the ratchet teeth 59.

Figure 4:
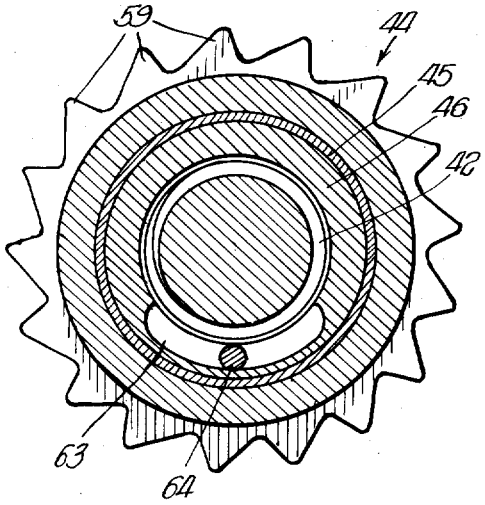
FIGURE 4 is a view, at an enlarged scale, taken generally along the line 4—4 of FIGURE 2.

Reference has been made hereinbefore to the undesirability of rotating the chain winding drum 17 in the reverse direction to wind up the chain 15. In the event that this should take place, the rotation of the main gear wheel 23 in the reverse direction will be arrested as soon as the second link 20 engages the chain stop 21. However, if the brakeman inadvertently continued to rotate the hand wheel 56 in the wrong direction, he would cause the pressure nut 41 to move away from the clutch flange 43. In view of the small lead of the threads on the threaded section 42, a substantial force could be developed which might result in damage to the hand brake mechanism 10. With a view to preventing such improper operation the hub 46 of the pressure nut 41 is provided with an arcuate slot 63, FIGURE 4, for receiving a stop pin 64, FIGURES 2 and 4, which is carried by the clutch flange 43. The stop pin 64 limits the relative rotation between the hand wheel shaft 26 and the pressure nut 41 to the extent permitted by the arcuate slot 63. Should the brakeman rotate the hand wheel 56 in the release direction, indicated by the arrow 65, to such an extent that the arm 19 picks up the second link 20 and causes it to engage the chain stop 21, the main gear wheel 23 is arrested and likewise further rotation of the pinion 24 is prevented. Since the pressure nut 41 rotates conjointly with the pinion 24, the hand wheel shaft 26 can only rotate relative thereto through an extent determined by the movement of the stop pin 64 to the end of the arcuate slot 63. No further rotation of the hand wheel 56 in the release direction then is permitted. By limiting the relative movement between the hand wheel shaft 26 and the pressure nut 41, there is no likelihood of damage to the mechanism. In operation, when it is desired to apply the brakes, the hand wheel 56 is rotated in the direction indicated by the arrow 66, FIGURE 1. Since there will be some tension applied to the chain 15, there will be some resistance to rotation by the pinion 24 and the pressure nut 41. The rotation of the hand wheel 56 and shaft 26 against this tension will cause the pressure nut 41 to rotate slightly along the threaded section 42 and to clamp the clutch plate 44 between it and the clutch flange 43. The driving connection, previously described, is maintained and, as the clutch plate 44, is rotated, the pawl 60 cooperates with the ratchet teeth 59 to prevent reverse rotation.

The tension on the chain 15 tends to maintain the driving connection and to grip securely the clutch plate 44 in the driving position. Regardless of the amount of vibration to which the car and the hand brake mechanism 10 may be subjected, there is no likelihood that the driving connection will be impaired.

When it is desired to release the brakes, the hand wheel 56 is rotated in the direction indicated by the arrow 65, FIGURE 1. Such rotation tends to cause the pressure nut 41 to back away slightly from the clutch plate 44 while it is held against rotation by the pawl 60. The pressure nut 41 and pinion 24 then rotate in a brake releasing direction together with the hand wheel shaft 26 and hand wheel 56 as long as sufficient torque is applied to the latter to relieve the pressure applied to opposite sides of the clutch plate 44 sufficiently to permit slippage between it and the clutch flange 43 on one hand and the pressure nut 41 on the other.

By employing friction discs 47 and 50 of non-metallic material or insulating material, as described, there is no likelihood of electrolytic action taking place between the adjacent parts. Such action might take place if the discs were formed of metal and were dissimilar to the metal forming the adjacent parts.

By forming the pinion 24 and its flange 37 as a separate part, it is possible to provide sufficient stock for the teeth. At the same time it can be mounted on the reduced diameter section 25 of the shaft 26 which serves principally as a guide and centering means. Since the pressure nut 41 has substantial force applied to it, it is desirable that it be relatively large and that the threaded section 42 with which it cooperates also be relatively large. This construction is permitted by appropriately forming the hand wheel shaft 26 as illustrated.

Preferably the pinion 24 and its integral flange 37 constitute a one piece steel casting. Likewise, the pressure nut 41 and its hub 46 are a one piece steel casting. Also, the hand wheel shaft 26 is a steel casting which is machined suitably to provide the construction shown.

Since certain changes can be made in the foregoing construction and different embodiments of the invention can be made without departing from the spirit and scope thereof, it is intended that all matter shown in the accompanying drawings and described hereinbefore, shall be interpreted as illustrative and not in a limiting sense.

What is claimed as new is:

1. In a hand brake mechanism, the combination with a rotary chain winding drum and a main gear wheel of: a rotatable hand wheel shaft having a reduced diameter section at one end, an enlarged externally threaded section adjacent thereto, a hand wheel receiving section at the other end, and [an integral] *a* clutch flange between said threaded section and said hand wheel receiving section, *said clutch flange being secured to and conjointly rotatable with said hand wheel shaft;* a pinion freely rotatably mounted on said reduced diameter section and engaging said gear wheel and having an integral radially extending flange, an internally threaded pressure nut separate and distinct from said pinion, said pressure nut being rotatable on said threaded section and having a laterally extending integral hub and an annular portion having a clutch face spaced from a clutch face on said clutch flange, means operatively interconnecting said flange on said pinion and said annular portion on said pressure nut to provide conjoint rotation thereof, a clutch plate journaled on said hub having clutch faces on opposite sides facing said clutch faces on said clutch flange and on said annular portion of said pressure nut respectively, means cooperating with said clutch plate and preventing reverse rotation thereof, and friction discs between said juxtaposed clutch faces.

2. In a hand brake mechanism, the combination with a rotary chain winding drum and a main gear wheel of: a rotatable hand wheel shaft having a reduced diameter section at one end, an enlarged externally threaded section adjacent thereto, a hand wheel receiving section at the other end, and [an integral] *a* clutch flange between said threaded section and said hand wheel receiving section, *said clutch flange being secured to and conjointly rotatable with said hand wheel shaft;* a pinion freely rotatably mounted on said reduced diameter section and engaging said gear wheel and having an integral radially extending flange, an internally threaded pressure nut separate and distinct from said pinion, said pressure nut being rotatable on said threaded section and having a laternally extending integral hub and an annular portion having a clutch face spaced from a clutch face on said clutch flange, means operatively interconnecting said flange on said pinion and said annular portion on said pressure nut to provide conjoint rotation thereof, a clutch plate journaled on said hub having clutch faces on opposite sides facing said clutch faces on said clutch flange and on said annular portion of said pressure nut respectively, means cooperating with said clutch plate and preventing reverse rotation thereof, and means limiting the relative rotation of said shaft and said pinion.

3. In a hand brake mechanism, the combination with a rotary chain winding drum and a main gear wheel of: a rotatable hand wheel shaft having a reduced diameter section at one end, an enlarged externally threaded section adjacent thereto, a hand wheel receiving section at the other end, and [an integral] *a* clutch flange between said threaded section and said hand wheel receiving section, *said clutch flange being secured to and conjointly rotatable with said hand wheel shaft;* a pinion freely rotatably mounted on said reduced diameter section and engaging said gear wheel and having an integral radially extending flange, an internally threaded pressure nut separate and distinct from said pinion, said pressure nut being rotatable on said threaded section and having a laterally extending integral hub and an annular portion having a clutch face spaced from a clutch face on said clutch flange, pin and slot means on said flange on said pinion and on said annular portion on said pressure nut providing conjoint rotation thereof, a clutch plate journaled on said hub having clutch faces on opposite sides facing said clutch faces on said clutch flange and on said annular portion of said pressure nut respectively, means cooperating with said clutch plate and preventing reverse rotation thereof, friction discs between said juxtaposed clutch faces, and means limiting the relative rotation of said shaft and said pinion.

4. In a hand brake mechanism, the combination with a rotary chain winding drum and a main gear wheel of: a rotatable hand wheel shaft having a reduced diameter section at one end, an enlarged externally threaded section adjacent thereto, a hand wheel receiving section at the other end, and [an integral] *a* clutch flange between said threaded section and said hand wheel receiving section, *said clutch flange being secured to and conjointly rotatable with said hand wheel shaft;* a pinion rotatably mounted on said reduced diameter section and engaging said gear wheel and having an integral radially extending flange, an internally threaded pressure nut on said threaded section having a laterally extending integral hub provided with an arcuate slot, pin and slot means on said flange on said pinion and on said pressure nut providing conjoint rotation thereof, a clutch plate journaled on said hub having clutch faces on opposite sides facing clutch faces on said clutch flange and on said pressure nut respectively, means cooperating with said clutch plate and preventing reverse rotation thereof, friction discs between said juxtaposed clutch faces, and a stop pin extending laterally from said annular flange on said shaft into said arcuate slot in said hub.

5. In a hand brake mechanism, the combination with a rotary chain winding drum and a main gear wheel of: a rotatable hand wheel shaft having a reduced diameter section at one end, an enlarged externally threaded section adjacent thereto, a hand wheel receiving section at the other end, and [an integral] *a* clutch flange between said threaded section and said hand wheel receiving section, *said clutch flange being secured to and conjointly rotatable with said hand wheel shaft;* a pinion freely rotatably mounted on said reduced diameter sertion and engaging said gear wheel and having an integral radially extending flange provided with one of more lugs extending laterally therefrom, an internally threaded pressure nut separate and distinct from said pinion, said pressure nut being rotatable on said threaded section and having one or more slots for receiving said lug or lugs to provide conjoint rotation of said pinion and pressure nut and a laterally extending integral hub and an annular portion having a clutch face spaced from a clutch face on said clutch flange, a clutch plate journaled on said hub having clutch faces on opposite sides facing said clutch faces on said clutch flange and on said annular portion of said pressure nut respectively, means cooperating with said clutch plate and preventing reverse rotation thereof, and friction discs between said juxtaposed clutch faces.

6. In a hand brake mechanism, the combination with a rotary chain winding drum and a main gear wheel of: a rotatable hand wheel shaft having a reduced diameter section at one end, an enlarged externally threaded section adjacent thereto, a hand wheel receiving section at the other end, and [an integral] *a* clutch flange between said threaded section and said hand wheel receiving section, *said clutch flange being secured to and conjointly rotatable with said hand wheel shaft;* a pinion rotatably mounted on said reduced diameter section adn engaging said gear wheel and having an integral radially extending flange provided with one or more lugs extending laterally therefrom, an internally threaded pressure nut on said threaded section having one or more slots for receiving said lug or lugs to provide conjoint rotation of said pinion and pressure nut and a laterally extending integral hub provided with an arcuate slot, a clutch plate journaled on said hub having clutch faces on opposite sides facing clutch faces on said clutch flange and on said pressure nut respectively, means cooperating with said clutch plate and preventing reverse rotation thereof, nonmetallic friction discs between said juxtaposed clutch faces, and a stop pin extending laterally from said annular flange on said shaft into said arcuate slot in said hub.

7. *In a hand brake mechanism, the combination with a rotary chain winding drum and a main gear wheel of: a rotatable hand wheel shaft having a reduced diameter section at one end, an enlarged externally threaded section adjacent thereto, a hand wheel receiving section at the other end, and a clutch flange between said threaded section and said hand wheel receiving section, said clutch flange being secured to and conjointly rotatable with said hand wheel shaft; a pinion freely rotatably mounted on said reduced diameter section and engaging said gear wheel, said pinion having thereon a radially extending flange rotatable conjointly therewith, an internally threaded pressure nut separate and distinct from said pinion, said pressure nut being rotatable on said threaded section and having a laterally extending integral hub and an annular portion having a clutch face spaced from a clutch face on said clutch flange, means operatively interconnecting said flange on said pinion and said annular portion on said pressure nut to provide conjoint rotation thereof, a clutch plate journaled on said hub having clutch faces on opposite sides facing said clutch faces on said clutch flange and on said annular portion of said pressure nut respectively, means cooperating with said clutch plate and preventing reverse rotation thereof, and friction discs between said juxtaposed clutch faces.*

8. *In a hand brake mechanism, the combination with a rotary chain winding drum and a main gear wheel of: a rotatable hand wheel shaft having a reduced diameter*

*section at one end, an enlarged externally threaded section adjacent thereto, a hand wheel receiving section at the other end, and a clutch flange between said threaded section and said hand wheel receiving section, said clutch flange being secured to and conjointly rotatable with said hand wheel shaft; a pinion freely rotatably mounted on said reduced diameter section and engaging said gear wheel, said pinion having thereon a radially extending flange rotatable conjointly therewith, an internally threaded pressure nut separate and distinct from said pinion, said pressure nut being rotatable on said threaded section and having a laterally extending integral hub and an annular portion having a clutch face spaced from a clutch face on said clutch flange, means operatively interconnecting said flange on said pinion and said annular portion on said pressure nut to provide conjoint rotation thereof, a clutch plate journaled on said hub having clutch faces on opposite sides facing said clutch faces on said clutch flange and on said annular portion of said pressure nut respectively, means cooperating with said clutch plate and preventing reverse rotation thereof, and means limiting the relative rotation of said shaft and said pinion.*

*9. In a hand brake mechanism, the combination with a rotary chain winding drum and a main gear wheel of: a rotatable hand wheel shaft having a reduced diameter section at one end, an enlarged externally threaded section adjacent thereto, a hand wheel receiving section at the other end and a clutch flange between said threaded section and said hand wheel receiving section, said clutch flange being secured to and conjointly rotatable with said hand wheel shaft; a pinion freely rotatably mounted on said reduced diameter section and engaging said gear wheel, said pinion having thereon a radially extending flange rotatable conjointly therewith, an internally threaded pressure nut separate and distinct from said pinion, said pressure nut being rotatable on said threaded section and having a laterally extending integral hub and an annular portion having a clutch face spaced from a clutch face on said clutch flange, pin and slot means on said flange on said pinion and on said annular portion on said pressure nut providing conjoint rotation thereof, a clutch plate journaled on said hub having clutch faces on opposite sides facing said clutch faces on said clutch flange and on said annular portion of said pressure nut respectively, means cooperating with said clutch plate and preventing reverse rotation thereof, friction discs between said juxtaposed clutch faces, and means limiting the relative rotation of said shaft and said pinion.*

*10. In a hand brake mechanism, the combination with a rotary chain winding drum and a main gear wheel of: a rotatable hand wheel shaft having a reduced diameter section at one end, an enlarged externally threaded section adjacent thereto, a hand wheel receiving section at the other end, and a clutch flange between said threaded section and said hand wheel receiving section, said clutch flange being secured to and conjointly rotatable with said hand wheel shaft; a pinion rotatably mounted on said reduced diameter section and engaging said gear wheel, said pinion having thereon a radially extending flange rotatable conjointly therewith, an internally threaded pressure nut on said threaded section having a laterally extending integral hub provided with an arcuate slot, pin and slot means on said flange on said pinion and on said pressure nut providing conjoint rotation thereof, a clutch plate journaled on said hub having clutch faces on opposite sides facing clutch faces on said clutch flange and on said pressure nut respectively, means cooperating with said clutch plate and preventing reverse rotation thereof, friction discs between said juxtaposed clutch faces, and a stop pin separate and distinct from said pin means extending laterally from said annular flange on said shaft into said arcuate slot in said hub.*

*11. In a hand brake mechanism, the combination with a rotary chain winding drum and a main gear wheel of: a rotatable hand wheel shaft having a reduced diameter section at one end, an enlarged externally threaded section adjacent thereto, a hand wheel receiving section at the other end, and a clutch flange between said threaded section and said hand wheel receiving section, said clutch flange being secured to and conjointly rotatable with said hand wheel shaft; a pinion freely rotatably mounted on said reduced diameter section and engaging said gear wheel, said pinion having thereon a radially extending flange rotatable conjointly therewith, said flange on said pinion having one or more lugs extending laterally therefrom, an internally threaded pressure nut separate and distinct from said pinion, said pressure nut being rotatable on said threaded section and having one or more slots for receiving said lug or lugs to provide conjoint rotation of said pinion and pressure nut and a laterally extending integral hub and an annular portion having a clutch face spaced from a clutch face on said clutch flange, a clutch plate journaled on said hub having clutch faces on opposite sides facing said clutch faces on said clutch flange and on said annular portion of said pressure nut respectively, means cooperating with said clutch plate and preventing reverse rotation thereof, and friction discs between said juxtaposed clutch faces.*

*12. In a hand brake mechanism, the combination with a rotary chain winding drum and a main gear wheel of: a rotatable hand wheel shaft having a reduced diameter section at one end, an enlarged externally threaded section adjacent thereto, a hand wheel receiving section at the other end, and a clutch flange between said threaded section and said hand wheel receiving section, said clutch flange being secured to and conjointly rotatable with said hand wheel shaft; a pinion rotatably mounted on said reduced diameter section and engaging said gear wheel, said pinion having thereon a radially extending flange rotatable conjointly therewith, said flange on said pinion having one or more lugs extending laterally therefrom, an internally threaded pressure nut on said threaded section having one or more slots for receiving said lug or lugs to provide conjoint rotation of said pinion and pressure nut and a laterally extending integral hub provided with an arcuate slot, a clutch plate journaled on said hub having clutch faces on opposite sides facing clutch faces on said clutch flange and on said pressure nut respectively, means cooperating with said clutch plate and preventing reverse rotation thereof, non-metallic friction discs between said juxtaposed clutch faces, and a stop pin extending laterally from said annular flange on said shaft into said arcuate slot in said hub.*

References Cited in the file of this patent or the original patent

UNITED STATES PATENTS

| | | |
|---|---|---|
| 2,207,500 | Van Cleave | July 9, 1940 |
| 2,280,180 | Van Cleave | Apr. 21, 1942 |
| 2,313,602 | Van Cleave | Mar. 9, 1943 |
| 2,414,960 | Martin | Jan. 28, 1947 |
| 2,501,096 | Robins et al. | Mar. 21, 1950 |
| 2,687,196 | Camp | Aug. 24, 1954 |
| 2,725,132 | O'Connor | Nov. 29, 1955 |